(12) United States Patent
Watatani et al.

(10) Patent No.: US 7,816,160 B2
(45) Date of Patent: Oct. 19, 2010

(54) MANUFACTURING METHOD FOR SEMICONDUCTOR DEVICE

(75) Inventors: Chikara Watatani, Tokyo (JP); Takashi Nagira, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 154 days.

(21) Appl. No.: 12/201,114

(22) Filed: Aug. 29, 2008

(65) Prior Publication Data

US 2009/0246903 A1     Oct. 1, 2009

(30) Foreign Application Priority Data

Apr. 1, 2008     (JP) ............... 2008-095382

(51) Int. Cl.
*H01L 21/00*     (2006.01)
(52) U.S. Cl. ........................ 438/32; 438/698
(58) Field of Classification Search .......... 438/32, 438/698
See application file for complete search history.

(56) References Cited

U.S. PATENT DOCUMENTS

| | | | |
|---|---|---|---|
| 5,023,198 A * | 6/1991 | Strege | 438/32 |
| 6,107,112 A | 8/2000 | Kito et al. | |
| 6,625,189 B1 | 9/2003 | Kito et al. | |
| 2003/0156604 A1 | 8/2003 | Yamazaki | |

FOREIGN PATENT DOCUMENTS

| | | |
|---|---|---|
| JP | 08-274406 A | 10/1996 |
| JP | 2000-261104 A | 9/2000 |
| JP | 2001-168455 A | 6/2001 |
| JP | 2003-243767 A | 8/2003 |
| JP | 2004-055881 A | 2/2004 |
| JP | 2006-049714 A | 2/2006 |

* cited by examiner

*Primary Examiner*—Matthew S Smith
*Assistant Examiner*—John M Parker
(74) *Attorney, Agent, or Firm*—Leydig, Voit & Mayer, Ltd.

(57) ABSTRACT

The present invention includes forming an optical guide layer on a substrate, forming a cap layer on the optical guide layer, and forming openings in parts of the optical guide layer and the cap layer to form a diffraction grating from part of the optical guide layer. The substrate is heated to a temperature less than a growth temperature of the cap layer and equal to at least a temperature at which mass transport of the cap layer occurs to cover, with part of the cap layer, the lateral faces of the optical guide layer exposed by the openings. A burying layer burying the diffraction grating is formed on the substrate, after the mass transport.

16 Claims, 5 Drawing Sheets

MANUFACTURING METHOD FOR SEMICONDUCTOR DEVICE

BACKGROUND OF THE INVENTION

1. Field of the Invention

The present invention relates to a manufacturing method for a semiconductor device provided with a diffraction grating, and particularly to a manufacturing method for a semiconductor device capable of maintaining a desired shape of the diffraction grating.

2. Background Art

A resonator structure of semiconductor laser may have a diffraction grating near an active layer to unify the emission wavelength. This diffraction grating has a periodic structure for selectively oscillating a specific wavelength emitted from the active layer. The resonator structure having the diffraction grating is called distributed feedback.

In general, the diffraction grating has a rectangular periodic structure formed by forming a layer called the guide layer and etching part of the guide layer. The shape of the above-mentioned diffraction grating is one of parameters for deciding an optical coupling coefficient indicating light wave-guided through the active layer and the degree of coupling of the diffraction grating. Here, the optical coupling coefficient is an important parameter for semiconductor laser because it contributes to the oscillation wavelength of the semiconductor laser and transmission characteristics. It is desirable that the diffraction grating be formed in a desired shape (a rectangle in the above-mentioned example) stably.

A forming method of a typical diffraction grating is as follows. First, a layer called an optical guide layer to be formed as a diffraction grating is formed. Next, a layer called a cap layer is formed on the optical guide layer. After that, an opening portion is formed in part of the optical guide layer and the cap layer using photo engraving and etching techniques. The formation of the opening portion is performed in such a manner that the optical guide layer forms the diffraction grating. Next, burying growth is performed to bury the above-mentioned opening portion, completing the diffraction grating.

In general, the substrate temperature during the above-mentioned burying growth is equivalent to the growth temperature of the cap layer and the guide layer. In other words, since the substrate temperature during the burying growth is higher enough than a temperature at which the cap layer and the optical guide layer cause mass transport, the mass transport is active. The shape of the diffraction grating of the optical guide layer can deform during the burying growth. Therefore, for example, there is a problem that the shape of the diffraction grating to be formed in a rectangular shape can vary during the burying growth to affect the optical coupling coefficient so that a desired laser oscillation wavelength and transmission characteristics cannot be obtained.

SUMMARY OF THE INVENTION

The present invention has been made to solve the above-mentioned problems, and an object thereof is to provide a manufacturing method for a semiconductor device capable of maintaining a desired shape because the shape of diffraction grating does not change after the processes such as the burying growth.

According to one aspect of the present invention, a manufacturing method for a semiconductor device having a diffraction grating, includes the steps of forming an optical guide layer on a substrate, forming a cap layer on the optical guide layer, and forming an opening portion in part of the optical guide layer and the cap layer in such a manner to form the diffraction grating from part of the optical guide layer. The manufacturing method also includes the steps of mass transporting in which the substrate is heated to a temperature less than a growth temperature of the cap layer and equal to or more than a temperature at which mass transport of the cap layer occurs to cover, with part of the cap layer, the lateral faces of the optical guide layer exposed to the opening portion, and forming a burying layer of the diffraction grating on the substrate after the mass transport.

Other and further objects, features and advantages of the invention will appear more fully from the following description.

DETAILED DESCRIPTION OF THE PREFERRED EMBODIMENT EMBODIMENT

Figure 1:
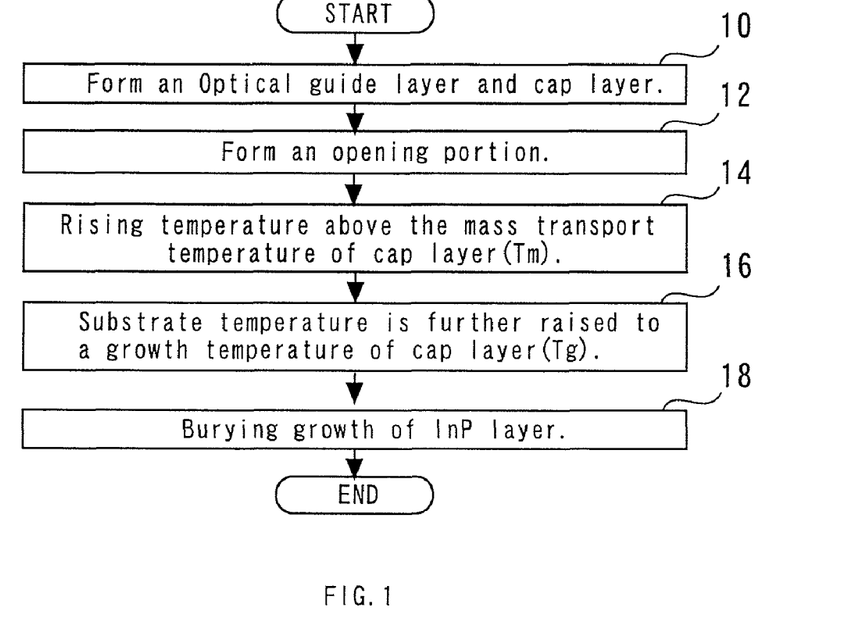
FIG. 1 is a flowchart explaining the embodiment.

The embodiment relates to a manufacturing method for a semiconductor device capable of forming a diffraction grating while maintaining its desired shape. In the embodiment, it is described about distributed feedback semiconductor laser as the semiconductor device having a diffraction grating. Referring to a flowchart of FIG. 1, the manufacturing method of the embodiment will be described. First, in step 10, an optical guide layer is formed on a substrate or a surface on which a buffer layer is formed. In the embodiment, the optical guide layer is made of InGaAsP with a thickness of 50 nm. The optical guide layer is formed at a substrate temperature of about 600 degrees C. using a method such as a MOVPE (Metal Organic Vapor Phase Epitaxy) method. A diffraction grating is formed in the optical guide layer in a process to be described layer.

Figure 3:
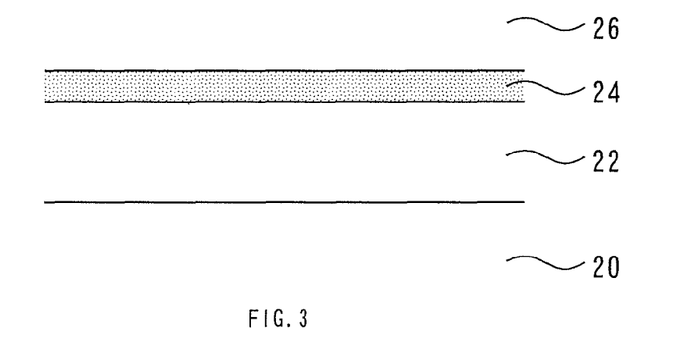
FIG. 3 shows a schematic view of a laminate structure after completion of the formation of the optical guide layer.

Further, in step 10, a cap layer is formed on the above-mentioned optical guide layer. In the embodiment, the cap layer is made of InP with a thickness of 80 nm. The cap layer is formed at the substrate temperature of about 600 degrees C.

using, for example, the MOVPE method or the like. FIG. 3 shows a schematic view of a laminate structure after completion of the process step 10. Upon completion of step 10, a laminate structure in which a substrate 20, a buffer layer 22, an optical guide layer 24, and a cap layer 26 are laminated is obtained.

After completion of processing step 10, the processing proceeds to step 12. In step 12, part of the cap layer 26, the optical guide layer 24, and the buffer layer 22 are etched to form an opening portion 30 shown in FIG. 4. This etching is to form a diffraction grating in the optical guide layer 24. Henceforth, the entire layer in which the optical guide layer 24 was formed is called the "optical guide layer 24" and parts remaining after etching of the optical guide layer 24 are called the "diffraction grating 28".

Figure 4:
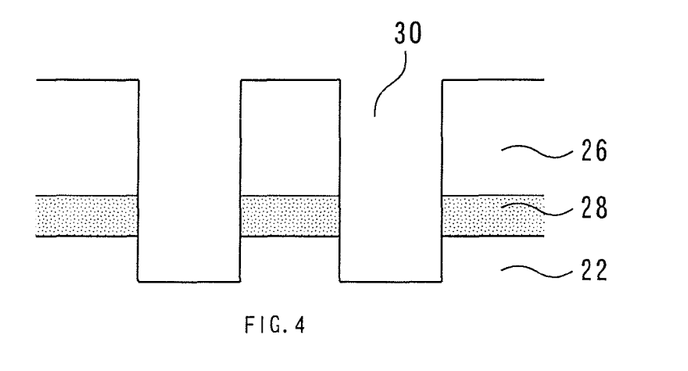
FIG. 4 shows the formation of opening portion.

It can be understood from FIG. 4 that the opening portion 30 formed in step 12 by etching part of the cap layer 26 and the optical guide layer 24, and the optical guide layer constructs the diffraction grating 28. Further, the buffer layer is also etched to a predetermined depth. In the embodiment, the depth of the opening portion 30 is 150 nm. Then, the width of the opening portion 30 and the width of a projection between the opening portions are 100 nm, and the ratio is 1:1.

The etching for forming the opening portion 30 is performed, for example, after going through an insulating film formation and photo engraving process. Upon completion of step 12, lateral faces of a structure element of the diffraction grating 28 are exposed to the opening portions 30 (the lateral faces of the optical guide layer 24 exposed in step 12, i.e., the lateral faces of the structure element of the diffraction grating 28). As shown in FIG. 4, as seen from a sectional view, two exposed lateral faces are formed with respect to each opening portion. Thus, after completion of step 12, the optical guide layer 24 is exposed to the opening portion 30.

Figure 2:
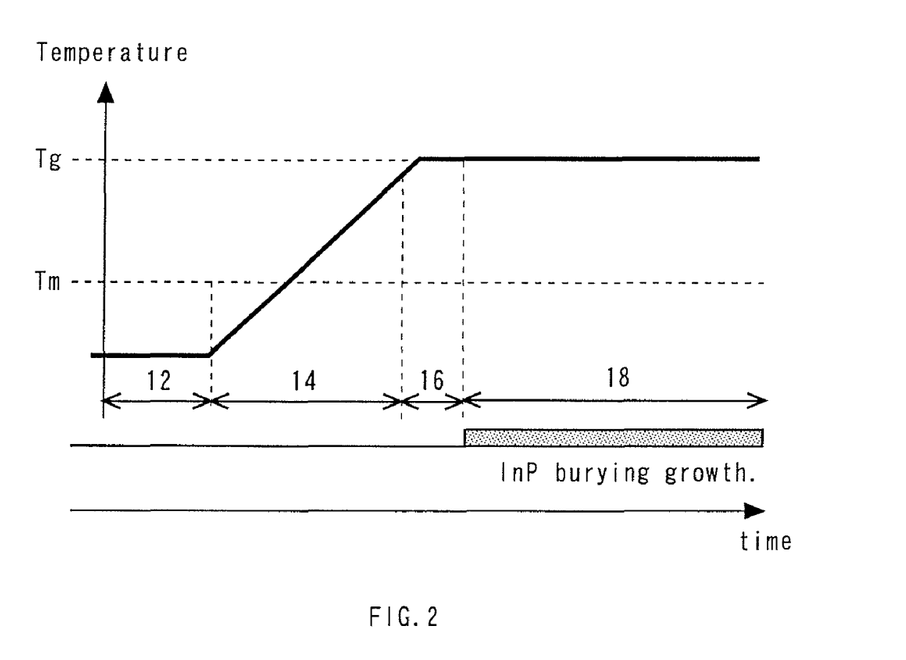
FIG. 2 shows the ascending heat sequence steps.

In the present invention, an ascending heat sequence of the substrate is important for a process to form and bury the diffraction grating. Therefore, as will be described later, FIG. 2 shows the ascending heat sequence steps 14, 16, and 18 following step 12. In FIG. 2, sections 12, 14, 16, and 18 correspond to steps 12, 14, 16, and 18 in FIG. 1. In step 12, etching and ashing are performed. However, they are performed at substrate temperatures of 200 and 250 degrees C., respectively, and such temperatures can be considered low enough in the present invention. Therefore, the section 12 in FIG. 2 is depicted as a constant temperature. Further, it is now common practice to perform etching and ashing for the formation of diffraction grating in a different apparatus from that for crystal growth.

After completion of the processing step 12, the processing proceeds to step 14. Step 14 is a process of mass transport of the cap layer 26 by heating the substrate (hereinafter called the "mass transport process"). In other words, the exposed lateral faces are covered with the above-mentioned mass transport in step 14.

To be more specific, the processing is as follows: First, the substrate on which the multilayer film is formed as described in connection with FIG. 4 is introduced to an MOVPE apparatus. Then, a phosphorus material such as phosphine ($PH_3$), and hydrogen (H2) or nitrogen (N2) are supplied into a chamber. Thus, the substrate is heated under a phosphorus atmosphere. In the embodiment, heating is performed continuously and steplessly. Here, Tm in FIG. 2 represents a temperature at which InP (mainly In) of the cap layer 26 starts mass transport, and it is typically about 400 degrees C. Further, Tg in FIG. 2 is a growth temperature of the cap layer 26, and it is about 600 degrees C.

Then, in step 14, the substrate 20 is heated to a range of temperatures equal to or more than Tm and less than Tg. When this processing is performed, the cap layer 26 (mainly In) of InP flows into the opening portion 30 due to mass transport. In flowing into the opening portion 30 is react on the above-mentioned $PH_3$ to become InP to cover the exposed lateral faces.

Figure 5:
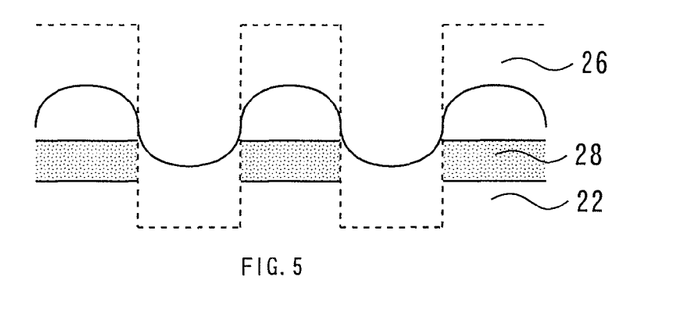
FIG. 5 show semiconductor laminated structure after heating.
Figure 6:
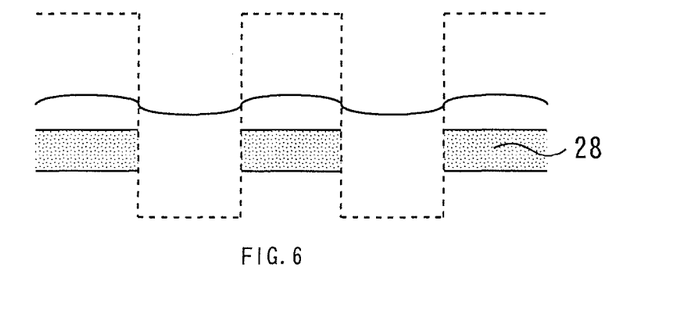
FIG. 6 show semiconductor laminated structure after enhanced mass transport.

Here, the heating time in step 14 is equal to or more than the time required to cover at least the exposed lateral faces with InP. Upon completion of step 14, a semiconductor laminated structure as shown in FIG. 5 is obtained. In other words, part of the cap layer 26 is subjected to mass transport to cover the exposed lateral faces and bury the opening portion. Note that the broken line portions in FIG. 5 indicate a shape before the start of mass transport for the convenience of explanation (the same holds true with regard to the broken lines in FIGS. 6, 7, 10, 13, and 14).

After completion of processing step 14, the processing proceeds to step 16. In step 16, the substrate temperature is further raised to a growth temperature (Tg) of the cap layer. When the substrate temperature reaches Tg, the mass transport of the cap layer 26 (mainly In) is enhanced. Although the diffraction grating is covered with the cap layer 26 at the start of step 16, the opening portion 30 still has a recessed portion and the surface is still rough. However, since the mass transport is enhanced in step 16, surface roughness can be reduced to flatten the surface (see FIG. 6).

Here, the cap layer 26 contributes to this flattening process. In other words, since the diffraction grating 28 has already been covered with the cap layer, it does not contribute to the mass transport, maintaining the shape.

Figure 7:
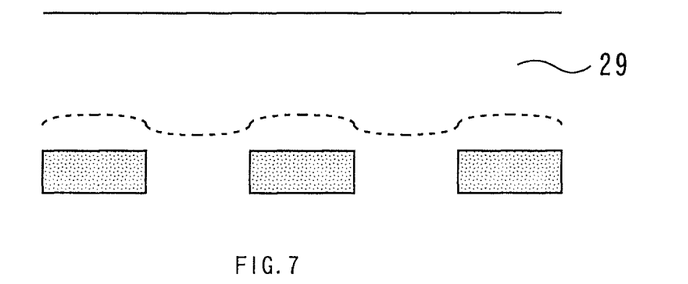
FIG. 7 shows a burying layer.

Upon completion of the processing step 16, the processing proceeds to step 18. In step 18, the burying growth of the InP layer is performed. The growth of InP is performed by introducing an In material such as trimethyl indium (TMIn) into a reactor of the MOPVE apparatus. Further, a P material such as phosphine ($PH_3$) is introduced as appropriate. After completion of step 16, a burying layer 29 is formed as shown in FIG. 7 (see FIG. 7). After completion of step 18, the routine of the embodiment is ended.

Figure 13:
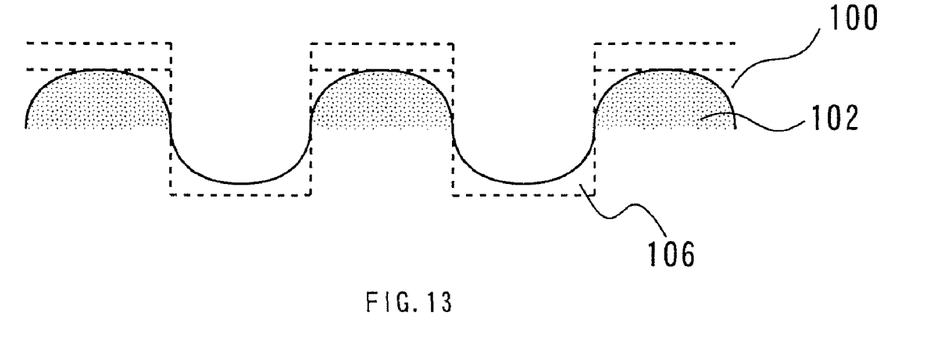
FIG. 13 show an example in which the temperature for mass transport of a cap layer is about as high as the growth temperature of the cap layer so that mass transport is caused up to a diffraction grating.
Figure 14:
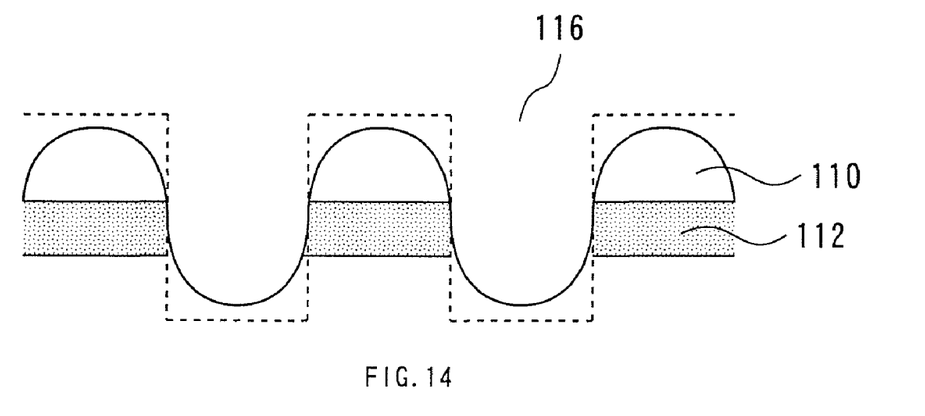
FIG. 14 shows a cap layer which is made thick so that the start temperature of the burying growth will be lower.

For example, if the exposed lateral faces are located immediately before the burying growth for burying the diffraction grating, components for constructing the diffraction grating during the burying growth may be subjected to mass transport. FIGS. 13 and 14 illustrate a structure in which the exposed lateral faces are located immediately before the burying growth. Note that the structures of FIGS. 13 and 14 and a manufacturing method for a semiconductor device are comparative examples for explaining the effects of the present invention.

FIG. 13 shows an example in which the temperature for mass transport of a cap layer 100 is about as high as the growth temperature of the cap layer so that mass transport is caused up to a diffraction grating 102. In other words, the diffraction grating 102 that has to have a periodic structure of a rectangular shape deforms. Further, even after the mass transport, the cap layer 100 is not enough to cover the diffraction grating 102, and there are the exposed lateral faces immediately before the burying growth.

In such a structure, mass transport of the diffraction grating occurs in the process of burying growth, especially near the exposed lateral faces, the deformation of the diffraction grating becomes more noticeable. In this case, although the surface flatness can be enhanced by mass transport of the cap layer, there has been a problem that the deformation of the diffraction grating occurs. There is also a problem that the burying growth makes the deformation of the diffraction grating becomes further more noticeable.

On the other hand, in the example of FIG. 14, a cap layer 110 is made thick so that the start temperature of the burying growth will be lower. Lowering the start temperature of the burying growth is to prevent the deformation of the diffraction grating due to the burying growth. In this case, a diffraction grating 112 can maintain its rectangular shape, but there is a problem that the crystalline of the semiconductor is deteriorated by lowering the start temperature of the burying growth. The deterioration of the semiconductor crystalline may deteriorate the characteristics as an optical element. Further, making the cap layer 110 thick results in an increase in the aspect ratio of an opening portion 116, i.e., in an increase in the depth of the diffraction grating, making it difficult to bury by the burying growth. Further, in this case, the surface flatness after the burying growth is also deteriorated.

In other words, the problems in the comparative examples are summarized as the following two points. First, since the mass transport of the cap layer is performed at a high temperature only for the purpose of improving the surface flatness, even the diffraction grating layer causes significant mass transport. Second, since the exposed lateral faces are located immediately before the burying growth, the shape of the diffraction grating deforms in the burying growth because the exposed lateral faces are located immediately before the burying growth. Since these are not prevented, there is a problem that the structure and the manufacturing method that involve some bad effects as in the example of FIG. 14 has to be employed.

The method of the embodiment can solve the above-mentioned problems. In other words, in the embodiment, the exposed lateral faces are covered in a mass transport process. Then, the mass transport process is performed at a temperature no lower than the mass transport starting temperature (Tm) of the cap layer and no higher than the growth temperature (Tg) of the cap layer. Thus, compared to the case where the temperature is raised to the growth temperature of the cap layer, the exposed lateral faces can be covered at a lower temperature. In other words, since the mass transport process is performed at a temperature lower than the burying process, it is hard to deform the shape of the diffraction grating (optical guide layer).

Further, the mass transport starting temperature (Tm) of InP is lower than the mass transport starting temperature of InGaAsP. Therefore, if the substrate temperature is about Tm, significant mass transport of InGaAsP, i.e., of the diffraction grating cannot be caused. Therefore, in the embodiment, an ascending heat speed is so moderated that the exposed lateral faces will be covered at a substrate temperature of about Tm. Then, after completion of the mass transport process, if the substrate is heated up to the growth temperature (Tg) of the cap layer, since the diffraction grating is covered with InP, the surface is flattened to a desired value without deforming the shape of the diffraction grating.

Similarly, since the exposed lateral faces do not exist immediately before the start of the burying growth, even if the temperature is raised up to the growth temperature of the cap layer (InP) during the burying growth, the shape of diffraction grating does not deform.

Further, the present invention features the layer thickness of the cap layer formed in step 10. The following describes this with reference to FIGS. 8, 9, and 10. First, the dimensions of each component are defined in FIG. 9 showing the laminate structure after the formation of the opening portion in step 12 of the embodiment. The layer thickness of the cap layer 26 is c [nm], and in the embodiment, it is 80 nm. Similarly, the layer thickness of the optical guide layer 28 is g [nm], and in the embodiment, it is 50 nm. The depth of the opening portion before the mass transport process is d [nm], and in the embodiment, it is 150 nm.

Figure 10:
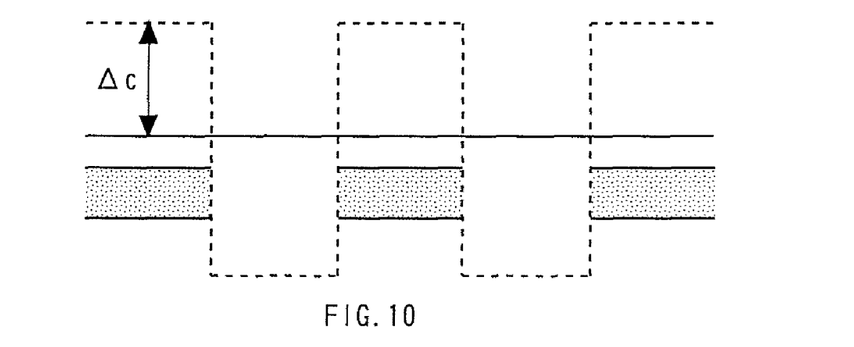
FIG. 10 shows the amount of change in layer thickness of the cap layer before and after the mass transport process.

Further, the width of the opening portion is $X_1$ [nm], and in the embodiment, it is 100 nm. Then, the width of the projection between opening portions is $X_2$ [nm], and in the embodiment, it is 100 nm. Then, the amount of change in layer thickness of the cap layer before and after the mass transport process is $\Delta c$ (FIG. 10).

Thus, if the dimensions of each component are defined, the sectional area $S_1$ of the opening portion to be buried in the mass transport process and flattening process (step 16) is $X_1(d-\Delta c)$. Here, since $S_1$ is equal to $X_2 \times \Delta c$ as a decrease of the cap layer 26, $S_1$ and $S_2$ match with each other to give the following equation:

$$X_1(d-\Delta c)=X_2 \times \Delta c \qquad \text{Eq. 1}$$

Further, if $X_1/X_2$ is defined as duty ratio r, the following equation 2 is given:

$$r(d-\Delta c)=\Delta c \qquad \text{Eq. 2}$$

Here, the following equation 3 shows such a condition that the diffraction grating does not deform in the mass transport process and the flattening process (step 16):

$$c-\Delta c>0 \qquad \text{Eq. 3}$$

The following equation 4 can be derived from Eq. 2 and Eq. 3:

$$c>r/(1+r)d \qquad \text{Eq. 4}$$

Further, since the depth of the opening portion should be larger than the sum of c and g, the following equation is given:

$$d>c+g \qquad \text{Eq. 5}$$

Eq. 5 can deform like Eq. 6 as follows:

$$c<d-g \qquad \text{Eq. 6}$$

Figure 8:
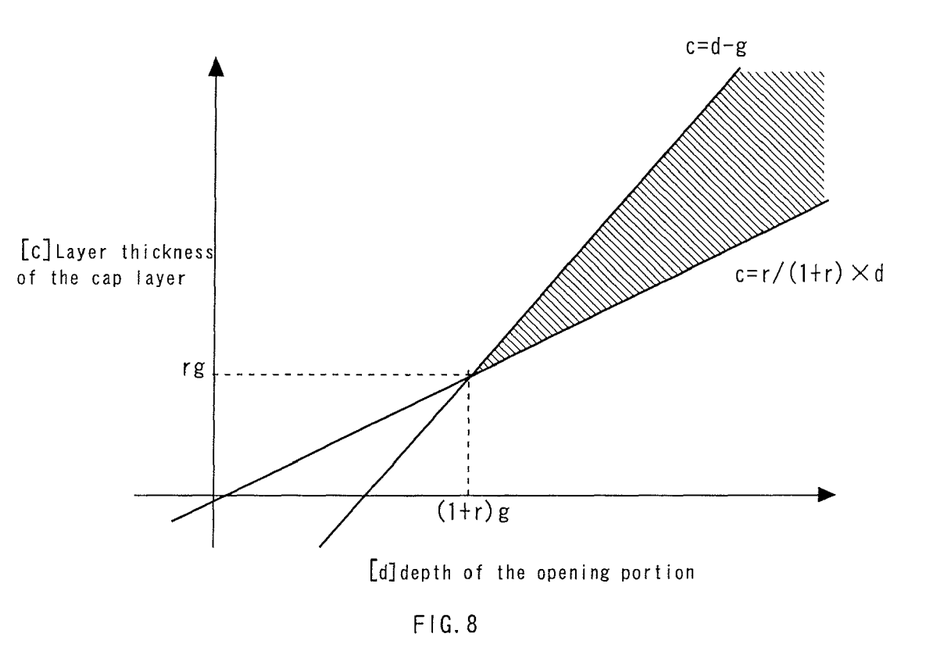
FIG. 8 show an appropriate value of the depth of the opening portion before the mass transport process (d) and thickness of cap layer (c)
Figure 9:
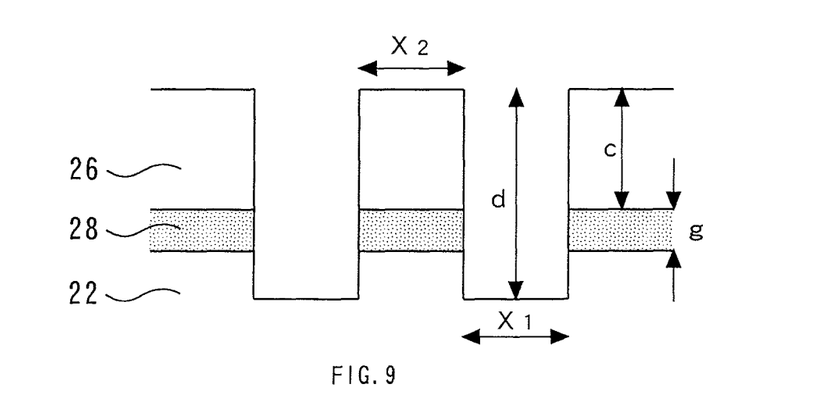
FIG. 9 shows the laminate structure after the formation of the opening portion.

The hatched area in FIG. 8 meets Eq. 4 and Eq. 6. In the embodiment, the layer thickness c of the cap layer 26 is thus defined, the cap layer for burying the opening portion can be more or less formed.

In the embodiment, the temperature is raised in the mass transport process continuously and steplessly, but the present invention is not limited thereto. For example, if the substrate temperature is held for a constant period of time near the mass transport starting temperature (Tm) of the cap layer in the temperature rise process to more ensure the covering of the exposed lateral faces, so that the effect of preventing the deformation of the shape of the diffraction grating increases.

Thus, the ascending heat sequence in the mass transport process is not particularly limited to that of the embodiment as long as the exposed lateral faces can be covered due to mass transport of the cap layer. Similarly, in the flattening process and the burying growth process, since there is no fear that the shape of the diffraction grating will deform, processing can be performed at a desired substrate temperature. Thus, for example, even if the substrate temperature is held at a temperature higher than the InP (cap layer) growth temperature (Tg) in the flattening process, the advantages of the present invention are not lost. Therefore, the present invention is not limited to the substrate temperature described in the embodiment.

In the embodiment, the cap layer is InP and the optical guide layer is InGaAsP, but the present invention is not limited thereto. In other words, the features of the present invention are that the mass transport process is performed before the burying growth to cover the exposed lateral faces at a temperature lower than the burying growth temperature, preventing the shape of the diffraction grating from deforming. Therefore, the materials of the semiconductor device are not particularly limited unless they are without departing from the scope of the present invention. Similarly, the polarities of the laminate structure, doping materials, amount of doping (carrier concentration), etc. are optional.

In the embodiment, the buffer layer, the optical guide layer, and the cap layer are formed on the substrate in this order, and the diffraction grating is formed and buried, but the present invention is not limited thereto. For example, in a semiconductor laser structure, the present invention can be implemented even when the diffraction grating is formed in a layer on the active layer. Therefore, upon forming the diffraction grating, the structure of a lower layer is not particularly limited.

Further, the embodiment has the surface flattening process described in step 16, but the present invention is not limited thereto. In other words, this flattening process is to prepare for a process requesting "surface flatness" such as the formation of the active layer in a subsequent process after the flattening process. This is not an essential process only in the sense that the process does not need to be performed unless otherwise requested.

Figure 11:
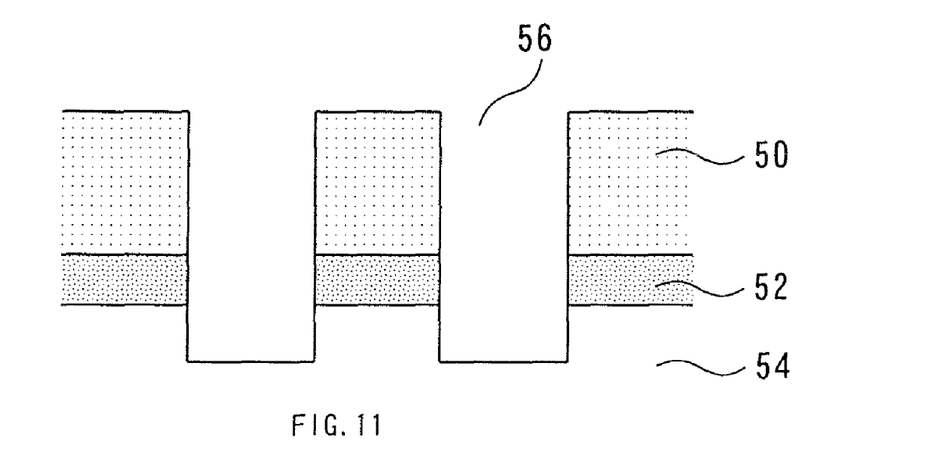
FIG. 11 shows the cap layer and a diffraction grating before mass transport process.
Figure 12:
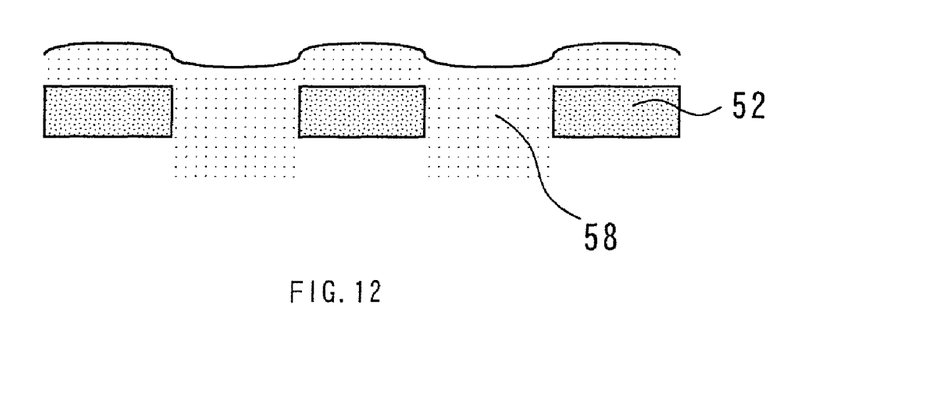
FIG. 12 shows the alternatively aligned diffraction grating and a cap layer.

According to the manufacturing method for a semiconductor device of the embodiment, since the flattening process (step 16) is provided, the opening portions are buried after processing in this process. Therefore, a carrier concentration can be provided between a cap layer 50 and a diffraction grating 52 (FIG. 11) to perform the mass transport process and the flattening process. In this case, after completion of the flattening process, the diffraction grating 52 and a cap layer 58 are alternated in the optical guide layer as shown in FIG. 12.

A periodic distribution of carrier concentration in such a lateral direction (plane-parallel direction in which the optical guide layer is formed) is a parameter that influences the optical coupling coefficient between light wave-guided through the active layer and the diffraction grating. Thus, the optical coupling coefficient can be optimized by controlling the difference in carrier concentration.

According to the present invention, the shape of the diffraction grating can be maintained.

Obviously many modifications and variations of the present invention are possible in the light of the above teachings. It is therefore to be understood that within the scope of the appended claims the invention may be practiced otherwise than as specifically described.

The entire disclosure of a Japanese Patent Application No. 2008-095382, filed on Apr. 1, 2008 including specification, claims, drawings and summary, on which the Convention priority of the present application is based, are incorporated herein by reference in its entirety.

What is claimed is:

1. A method for manufacturing a semiconductor device having a diffraction grating, comprising:
    forming an optical guide layer on a substrate;
    forming a cap layer on the optical guide layer at a growth temperature;
    forming openings in parts of the optical guide layer and the cap layer, thereby forming the diffraction grating from part of the optical guide layer;
    heating the substrate to a temperature less than the growth temperature of the cap layer and to at least a temperature at which mass transport of the cap layer occurs, to cover, with part of the cap layer, lateral faces of the optical guide layer exposed by the openings; and
    thereafter, forming a burying layer of the diffraction grating on the substrate.

2. The method according to claim 1, further comprising flattening the substrate by heating the substrate to a temperature at least equal to the growth temperature of the cap layer before growing the burying layer and after the mass transport of the cap layer.

3. The method according to claim 2, including performing the mass transport of the cap layer and the flattening of the substrate in a phosphorus ambient.

4. The method according to claim 2, wherein
    the optical guide layer is InGaAsP,
    the cap layer is InP, and
    the burying layer is InP.

5. The method according to claim 4, including performing the mass transport of the cap layer and the flattening of the substrate in a phosphorus ambient.

6. The method according to claim 1, wherein the temperature of the substrate in the mass transport of the cap layer is lower than a temperature at which mass transport of the optical guide layer occurs.

7. The method according to claim 1, wherein
    the optical guide layer is InGaAsP,
    the cap layer is InP, and
    the burying layer is InP.

8. The method according to claim 1, including forming the cap layer to a thickness meeting the following equation:

$$d-g>c>rd(1+r)$$

where
    c is thickness of the cap layer,
    d is depth of the openings,
    g is thickness of the guide layer, and
    r is obtained by dividing width of the openings by width of a projection between openings.

9. The method according to claim 1, including controlling difference in carrier concentrations of the optical guide layer and the cap layer so that an optical coupling coefficient between light guided through the semiconductor device and the diffraction grating is higher than when the optical guide layer and the cap layer have no carrier concentrations.

10. A method for manufacturing a semiconductor device having a diffraction grating, comprising:
    forming an optical guide layer on a substrate;
    forming an InP cap layer on the optical guide layer at a growth temperature of about 600° C.;
    forming openings in parts of the optical guide layer and the InP cap layer, thereby forming the diffraction grating from part of the optical guide layer;
    heating the substrate to a temperature of at least about 400° C. and less than the growth temperature of the InP cap layer and at which mass transport of the InP cap layer occurs, to cover, with part of the InP cap layer, lateral faces of the optical guide layer exposed by the openings; and
    thereafter, forming a burying layer burying the diffraction grating on the substrate.

11. The method according to claim 10, further comprising flattening the substrate by heating the substrate to a temperature at least equal to the growth temperature of the InP cap layer before growing the burying layer and after the mass transport of the InP cap layer.

12. The method according to claim 10, wherein the temperature of the substrate in the mass transport of the InP cap layer is lower than a temperature at which mass transport of the optical guide layer occurs.

13. The method according to claim 10, wherein
the optical guide layer is InGaAsP, and
the burying layer is InP.

14. The method according to claim 11, including performing the mass transport of the InP cap layer and the flattening of the substrate in a phosphorus ambient.

15. The method according to claim 11, wherein
the optical guide layer is InGaAsP, and
the burying layer is InP.

16. The method according to claim 15, including performing the mass transport of the cap layer and the flattening of the substrate in a phosphorus ambient.

* * * * *